US006269376B1

(12) United States Patent
Dhillon et al.

(10) Patent No.: US 6,269,376 B1
(45) Date of Patent: Jul. 31, 2001

(54) METHOD AND SYSTEM FOR CLUSTERING DATA IN PARALLEL IN A DISTRIBUTED-MEMORY MULTIPROCESSOR SYSTEM

(75) Inventors: Inderjit Singh Dhillon, Berkeley; Dharmendra Shantilal Modha, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/179,027

(22) Filed: Oct. 26, 1998

(51) Int. Cl.[7] .................................................. G06F 17/00
(52) U.S. Cl. ............................. 707/101; 707/6; 707/102
(58) Field of Search ............................ 707/3–6, 200–206, 707/101–103; 704/9, 2–8, 241; 725/116

(56) References Cited

U.S. PATENT DOCUMENTS

| | | | |
|---|---|---|---|
| 5,448,727 | | 9/1995 | Annevelink . |
| 5,506,801 | * | 4/1996 | Tawel .................................... 708/801 |
| 5,519,789 | * | 5/1996 | Etoh ...................................... 382/225 |
| 6,024,018 | * | 2/2000 | Darel et al. ........................... 101/484 |
| 6,047,282 | * | 4/2000 | Wilson et al. ............................ 707/3 |
| 6,049,777 | * | 4/2000 | Sheena et al. ........................ 707/103 |
| 6,049,797 | * | 4/2000 | Guha et al. ............................... 707/5 |
| 6,070,159 | * | 5/2000 | Wilson et al. ............................ 707/6 |
| 6,092,072 | * | 7/2000 | Guha et al. ........................... 707/101 |

OTHER PUBLICATIONS

Ding et al., "Necessary conditions on minimal system configuration for general MISO Mamdani Fuzzy Systems as Universal Approximators", Systems, Man and Cybernetics, Part B, IEEE Transactions on, vol. 30, Issue 6, pp. 857–864, Dec. 2000.*

Paliwal et al., "Comments on 'modified K–means algorithm for vector quantizer design'", Image Processing, IEEE Transactions on, vol. 9, Issue 11, pp. 1964–1967, Nov. 2000.*

Lee et al., "Morphology–based three–dimensional interpolation", Medical Imaging, IEEE Transactions on, vol. 19, Issue 7, pp. 711–721, Jul. 2000.*

Berger, Marsha et al., "An Algorithm for Point Clustering and Grid Generation," IEEE Transactions on Systems, Man, and Cybernetics, vol. 21, No. 5, Sep./Oct. 1991, pp. 1278–1286.

Duda, Richard O. et al., "Pattern Classification and Scene Analysis," John Wiley & Sons, New York, 1973, pp. 210–257.

Ester, Martin et al., "A Database Interface for Clustering in Large Spatial Databases," Conference on Knowledge Discovery and Data Mining, KDD–95, AAAI Press, 1996, pp. 94–99.

(List continued on next page.)

*Primary Examiner*—Thomas Black
*Assistant Examiner*—David Jung
(74) *Attorney, Agent, or Firm*—Gates & Cooper LLP (57) ABSTRACT

A method, apparatus, article of manufacture, and a memory structure for clustering data points in parallel using a distributed-memory multi-processor system is disclosed. The disclosed system has particularly advantageous application to a rapid and flexible k-means computation for data mining. The method comprises the steps of dividing a set of data points into a plurality of data blocks, initializing a set of k global centroid values in each of the data blocks k initial global centroid values, performing a plurality of asynchronous processes on the data blocks, each asynchronous process assigning each data point in each data block to the closest global centroid value within each data block, computing a set of k block accumulation values from the data points assigned to the k global centroid values, and recomputing the k global centroid values from the k block accumulation values.

42 Claims, 10 Drawing Sheets

OTHER PUBLICATIONS

Fisher, Douglas H., "Knowledge Acquisition Via Incremental Conceptual Clustering," pp. 267–283 (originally published in Machine Learning, No. 2:139–172); 1987.

Fukunaga, K. et al., "A Branch and Bound Algorithm for Computing κ–Nearest Neighbors," IEEE Transactions on Computers, Jul. 1975, pp. 750–753.

Han, Eui–Hong (Sam) et al., "Clustering Based on Associated Rule Hypergraphs," Proceedings of the Workshop on Research Issues on Data Mining and Knowledge Discovery (DMKD '97), Tucson, Arizona, 1997, pp. 9–13.

Huang, Zhexue, "A Fast Clustering Algorithm to Cluster Very Large Categorical Data Sets in Data Mining," SIGMOD Workshop on Research Issues on Data Mining and Knowledge Discovery, SIGMOD–DMKD 1997, pp. 1–8.

Keim, Daniel A., "Enhancing Visual Clustering of Query–Dependent Database Visualization Techniques Using Screen–Filling Curves," Proceedings of the Workshop on Database Issues for Data Visualization, Atlanta, Georgia, 1995, pp. 101–110.

Ketterlin, A. et al., "Conceptual Clustering in Structured Databases: a Practical Approach," Proceedings of the First International Conference on Knowledge Discovery & Data Mining, KDD–95, AAAI Press, 1996, pp. 180–185.

Ng, Raymond T. et al., "Efficient and Effective Clustering Methods for Spatial Data Mining," Proceedings of the $20^{th}$ VLDB Conference, Santiago, Chile, 1994, pp. 144–155.

Pollard, David, "Quantization and the Method of κ–Means," IEEE Transactional on Information Theory, vol. IT–28, No. 2, Mar. 1982, pp. 199–205.

Pollard, David, "A Central Limit Theorem for κ–Means Clustering," The Annals of Probability, vol. 10, No. 4, 1982, pp. 919–926.

Ripley, Brian, "Pattern Recognition & Neural Networks," Cambridge University Press, 1996, pp. 311–322.

Ralambondrainy, H., "A Conceptual Version of the κ–means Algorithm," Pattern Recognition Letters 16, 1995, pp. 1147–1157.

Selim, Shokri Z. et al., "κ–Means–Type Algorithms: A Generalized Convergence Theorem and Characterization of Local Optimality," IEEE Transactions on Pattern Analysis and Machine Intelligence, vol. PAMI–6, No. 1, Jan. 1984, pp. 81–87.

Wharton, Stephen W., "A Generalized Histogram Clustering Scheme for Multidimensional Image Data," Pattern Recognition, vol. 16, No. 2, 1983, pp. 193–199.

* cited by examiner

FIG. 1

1:
2:
3:  MSE = LargeNumber;
4:
5:  Select k initial cluster centroids $\{m_j\}_{j=1}^{k}$;
6:
7:
8:  do {
9:      OldMSE = MSE;
10:     MSE´ = 0;
11:     for j = 1 to k
12:         m´$_j$ = 0; n´$_j$ = 0;
13:     endfor;
14:     for i = 1 to n
15:         for j = 1 to k
16:             compute squared Euclidean distance $d^2(\chi_i, m_j)$;
17:         endfor;
18:         find the closest centroid $m_\ell$ to $\chi_i$;
19:         m´$_\ell$ = m´$_\ell$ + $\chi_i$ ; n´$_\ell$ = n´$_\ell$ + 1;
20:         MSE´ = MSE´ + $d^2(\chi_i, m_\ell)$;
21:     endfor;
22:     for j = 1 to k
23:
24:
25:         n´$_j$ = max(n´$_j$, 1); m$_j$ = m´$_j$/n´$_j$ ;
26:     endfor;
27:     MSE = MSE´;
28: }while (MSE < OldMSE)

```
1:  P = MPI_Comm_size();
2:  μ = MPI_Comm_rank();
3:  MSE = LargeNumber;
4:  if (μ=0)
5:      Select k initial cluster centroids $\{m_j\}_{j=1}^{k}$;
6:  endif;
7:  MPI_Bcast ($\{m_j\}_{j=1}^{k}$, 0);
8:  do {
9:      OldMSE = MSE;
10:     MSE' = 0;
11:     for j = 1 to k
12:         $m'_j$ = 0; $n'_j$ = 0;
13:     endfor;
14:     for i = μ * (n/P)+1 to (μ+1) * (n/P)
15:         for j = 1 to k
16:             compute squared Euclidean
                    distance $d^2(x_i, m_j)$;
17:         endfor;
18:         find the closest centroid $m_\ell$ to $x_i$;
19:         $m'_\ell = m'_\ell + x_i$ ; $n'_\ell = n'_\ell + 1$;
20:         MSE' = MSE' + $d^2(x_i, m_\ell)$;
21:     endfor;
22:     for j = 1 to k
23:         MPI_Allreduce ($n'_j$, $n_j$, MPI_SUM);
24:         MPI_Allreduce ($m'_j$, $m_j$, MPI_SUM);
25:         $n_j$ = max($n_j$, 1); $m_j$ = $m_j/n_j$ ;
26:     endfor;
27:     MPI_Allreduce (MSE', MSE, MPI_SUM);
28: }while (MSE < OldMSE)
```

METHOD AND SYSTEM FOR CLUSTERING DATA IN PARALLEL IN A DISTRIBUTED-MEMORY MULTIPROCESSOR SYSTEM

BACKGROUND OF THE INVENTION

1. Field of the Invention

The present invention relates to systems and methods of data storage and retrieval, and in particular to a method and system for clustering data in a multiprocessor system.

2. Description of the Related Art

The ability to manage massive amounts of information in large scale databases has become of increasing importance in recent years. Increasingly, data analysts are faced with ever larger data sets, some of which measure in gigabytes or even terabytes. One way to increase the efficiency of the use of such databases is through the use of data mining. Data mining involves the process or processing masses of data to uncover patterns and relationships between data entries in the database. Data mining may be accomplished manually by slicing and dicing the data until a data pattern emerges, or it can be accomplished by data mining programs.

Clustering is a commonly used procedure in data mining algorithms. Practical applications of clustering include unsupervised classification and taxonomy generation, nearest neighbor searching, scientific discovery, vector quantization, text analysis, and navigation.

The k-means algorithm is a popular procedure for clustering data sets. This procedure assumes that the data "objects" to be clustered are available as points (or vectors) in a d-dimensional Euclidean space. The k-means algorithm seeks a minimum variance grouping of data that minimizes the sum of squared Euclidean distances from certain cluster centroids. The popularity of the k-means algorithm can be attributed to its relative ease of interpretation, implementation simplicity, scalability, convergence speed, adaptability to sparse data, and ease of out-of-core (out of the local memory of a single processor) implementation.

While the k-means algorithm is effective, it is no panacea for large databases like those of text documents and customer market data, which often include millions of data points. Applying the k-means algorithm in such cases can result in unacceptably long processing times and can exhaust the memory capacity of the processor implementing the algorithm. The use of non-volatile memory devices such as hard disks for virtual memory solves the memory problem, but at very high throughput cost. What is needed is a clustering algorithm and an apparatus for implementing that algorithm that allows for the rapid processing of large databases. The present invention satisfies that need.

SUMMARY OF THE INVENTION

To address the requirements described above, the present invention discloses a method, apparatus, article of manufacture, and a memory structure for detecting relationships in a database in parallel using a distributed-memory multi-processor system, thus allowing rapid and flexible k-means computation for data mining.

The method comprises the steps of dividing a set of data points into a plurality of data blocks, initializing a set of k global centroid values in each of the data blocks k initial global centroid values, performing a plurality of asynchronous processes on the data blocks, each asynchronous process assigning each data point in each data block to the closest global centroid value within each data block, computing a set of k block accumulation values from the data points assigned to the k global centroid values, and recomputing the k global centroid values from the k block accumulation values. The article of manufacture comprises a data storage device tangibly embodying instructions to perform the method steps described above.

The apparatus comprises a plurality of asynchronous processors, each associated with one of the plurality of data blocks and operating on the data points within the associated data blocks, each processor implementing a plurality of modules, including first module for initializing a set of k global centroid values to k initial global centroid values, a second module for assigning each data point in each data block to the closest global centroid value, a third module for computing a set of k block accumulation values from the data points assigned to the k global centroid values, and a fourth procedure for recomputing the global centroid values from the k block accumulation values from the plurality of data blocks.

The present invention also describes a memory for storing data for clustering a set of data points about k global centroid values. The memory is comprised of a plurality of local memories, each directly accessible by one of a plurality of processors intercoupled by a communication network. Each of the local memories comprises a data structure including a data block comprising a unique subset of the set of data points, block accumulation values and global centroid values.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
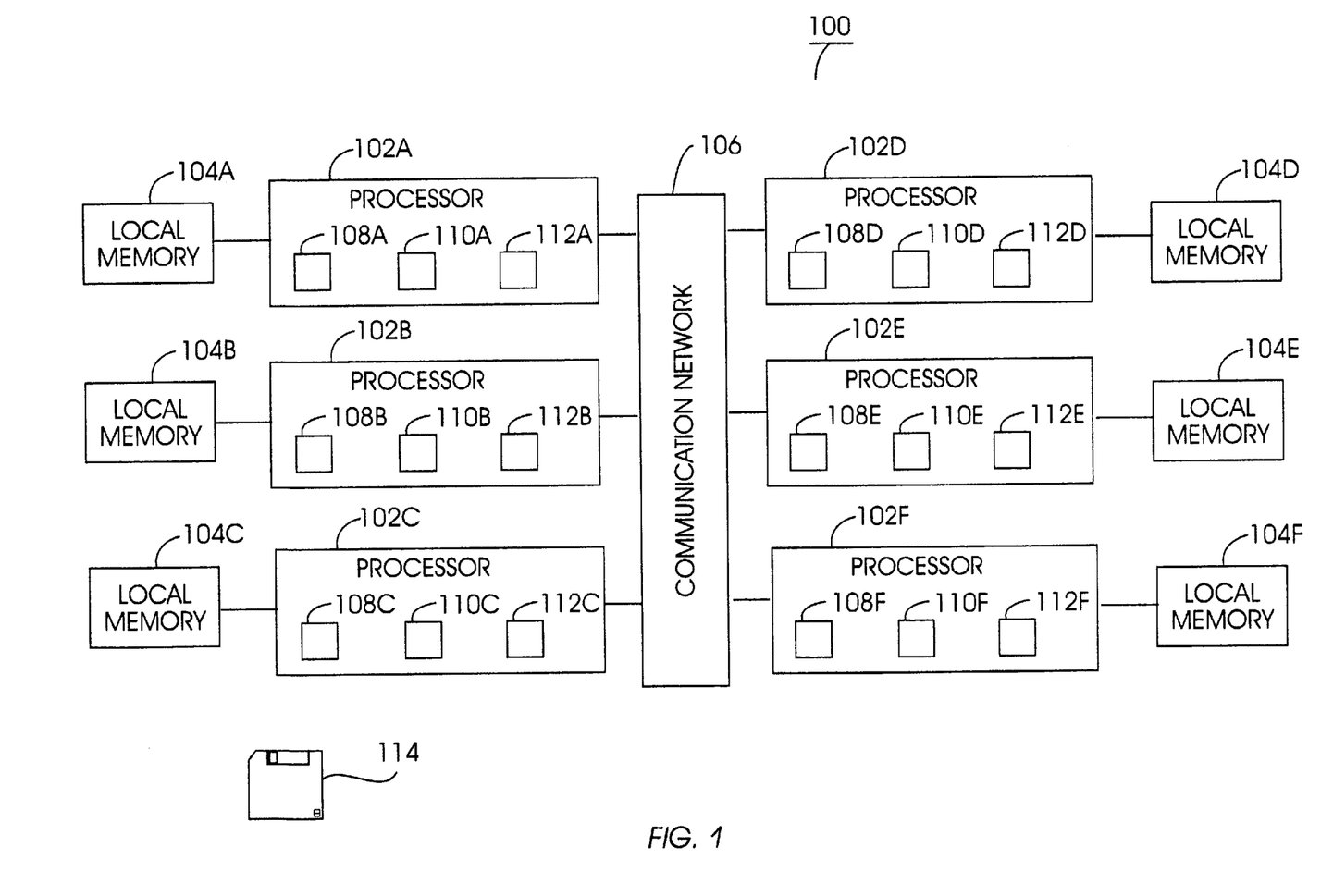
FIG. 1 is a block diagram of a distributed memory multiprocessor system.

FIG. 1 is a block diagram of a distributed memory multiprocessing system 100. The multiprocessing system comprises a plurality of processors 102A, 102B, 102C, 102D, 102E, and 102F (hereinafter collectively referred to as processor 102), and an associated local memory 104A, 104B, 104C, 104D, and 104F (hereinafter collectively referred to as local memory 104). Each processor 104 is coupled to a communication network 106, which allows communication of data and commands between the processors 102. In one embodiment, the communication network 106 provides fast, robust communications. Each processor may comprise separate software or hardware modules to perform the computations described herein. These modules are referred to in association with each module's associated processor, and are collectively referred to as software modules 118, 110, and 112. For example, software modules 108A, 110A, and 112A are associated with processor 102A.

Generally, instructions and/or data for performing the operations described herein are all embodied in or retrievable from a computer-readable device, medium, or carrier, e.g., a data storage device, a data communications device, etc. Moreover, these instructions and/or data, when read, executed, and/or interpreted by the client computer processor 102, causes the processor 102 and distributed memory multiprocessing system 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program medium") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

The present invention can be implemented by a number of different interconnection topologies. For example, although it is generally advantageous for processors 102 to access their local memories 104 than to communicate with another processor, each processor 102 may access data in a centralized memory via the communication network, or may access data stored in the local memory 104 associated with another processor, if necessary. Current examples of parallel processors suitable for use to implement the present invention include the INTEL PARAGON, THINKING MACHINES CM-5, IBM SP-2, NCUBE, CRAY T3D and MEIKO CS-2.

The parallelism represented by the distributed-memory multiprocessor 100 described above can be exploited in software using "message passing" techniques. The message passing model posits a set of processes the have only local memory, but are able to communicate with other processes by sending and receiving messages. A defining feature of the message-passing computer architecture model is that data transfers from the local memory of one process to the local memory of another process requires operations to be performed by both processes. A number of software libraries implementing the message passing paradigm are available. Among them the Message Passing Interface (MPI) has emerged as a standard, since it is robust, efficient and portable. MPI is also easy to use, because it provides bindings for FORTRAN 77 and C/C++.

An MPI implemented parallel computing model is implemented by writing a program (for example, in C, C++, or FORTRAN 77), compiling the program, and linking the compiled program to the MPI library, which encapsulates the details of the communications between the processors 104 in the multiprocessor network 100. To run the program thus compiled, P copies are made of the same program and each copy (representing a process) runs on each of the P processors 102 taking part in the computation, thus creating "P" parallel processes. Each process is assigned a unique identifier between 0 and P-1. Each process may follow a distinct execution path through the same code, and may communicate with other processes by calling appropriate routines in the MPI library. Thus defined, MPI supports a fully general single program, multiple data (SPMD) model.

Table I below shows a glossary of exemplary MPI routines which are useful in implementing the parallel processes described herein.

TABLE I

| | |
|---|---|
| MPI_Comm_size() | returns the number of processes |
| MPI_Comm_rank() | returns the process identifier for the calling process |
| MPIBcast(message, root) | Broadcasts a "message" from a process with identifier "root" to all of the processes |
| MPIAllReduce(A, B, MPI_SUM) | sums all the local copies of "A" in the processes (reduction operation) and places the result in "B" on all of the processes (broadcast operation) |
| MPI_Wtime() | returns the number of seconds since some fixed arbitrary point of time in the past |

The k-Means Process

To find a minimum variance clustering of N d-dimensional data points $$\{X_i\}_{i=1}^n$$

in $\Re^d$, k d-dimensional points $$\{m_j\}_{j=1}^k$$

must be determined such that $$\frac{1}{N}\sum_{i=1}^{n}\left(\min_j d^2(X_i, m_j)\right) \quad (1)$$

is minimized, where $d(X_i, m_j)$ denotes the Euclidean distance between $X_i$ and $m_j$. The points $\{m_j\}_{j=1}^k$ are known as cluster centroids or as cluster means. Informally, the problem of equation (1) is that of finding k cluster centroids such that the average squared Euclidean distance between a data point and its nearest cluster centroid is minimized. Unfortunately, this problem is known to be non-deterministic polynomial (NP)-complete. The k-means algorithm provides and easily implemented approximate solution to equation (1).

Figure 2:
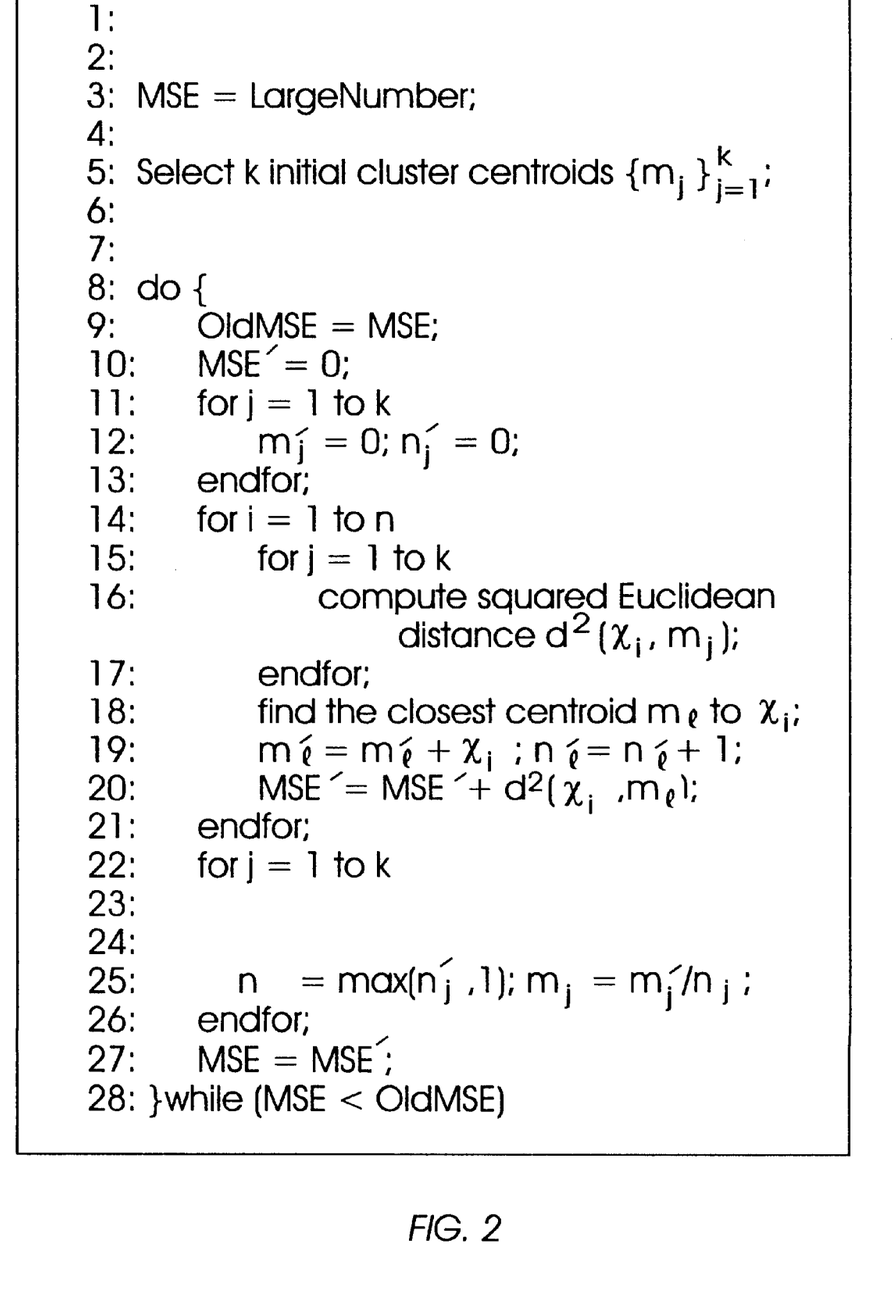
FIG. 2 is a diagram showing a listing of representative computer instructions to implement a serial k-means process.

FIG. 2 is a diagram showing a listing of representative computer program instructions implementing a k-means algorithm. The k-means algorithm comprises essentially three steps. These steps are as follows:

(a) Initialization: Select a set of k starting points $\{m_j\}_{j=1}^k$ in $\Re^d$ (as shown in line 5 of FIG. 2). The selection may be performed in a random manner, or according to some heuristic;

(b) Distance Calculation: For each data point $X_i, 1 \leq i \leq n$ compute its Euclidean distance to each cluster centroid $m_j, 1 \leq j \leq k$, and find the closest cluster centroid (illustrated in lines 14–21 of FIG. 2). Assign each such data point to the closest cluster centroid;

(c) Centroid Recalculation: For each $1 \leq j \leq k$, recompute cluster centroid $m_j$ as the average of data points assigned to it (implemented by lines 22–26 of FIG. 2); and (d) Convergence Condition: Repeat steps (b) and (c) until some convergence condition is met (implemented by line 28 of FIG. 2).

The k-means algorithm can be thought of as a gradient-descent procedure which starts at the initial starting cluster centroids and iteratively updates these centroids to decrease the objective function in equation (1). This k-means algorithm will always converge to a local minimum of equation (1), but the particular local minimum may not be the global minimum, and the particular local minimum depends on the initial starting cluster points.

Before the above algorithm converges, steps (b) and (c) above must be executed a number of times. This number of k-means iterations (hereinafter denoted as $\Im$), is a positive integer which can vary depending on the initial starting cluster centroids, even on the same data set.

Computational complexity is often described in terms of the number of floating point operations (flops) such as additions, multiplications, or comparisons required to perform the computation. The number of computations within each k-means iteration (including the "distance calculations" of lines 14–21 and the "centroid recalculations" of lines 22–26) in the algorithm depicted in FIG. 2 is substantially constant. In particular, the "distance calculations" require roughly (3Nkd+Nk+Nd+kd) flops per iteration, where 3Nkd, Nk, and kd correspond to lines 15–17, line 18, and line 19 of the implementation depicted in FIG. 2. Similarly, the "centroid recalculations" require approximately kd flops per iteration.

Using the foregoing, the computation complexity of a sequentially implemented k-means algorithm is estimated as $$(3Nkd+Nk+Nd+kd) \cdot \Im \cdot T^{flop} \quad (2)$$

where $\Im$ denotes the number of k-means iterations and $T^{flop}$ denotes the time (in seconds) for a floating point operation.

When the number of data points is large (both in the absolute sense, and when compared to d and k), the serial complexity of the k-means algorithm is dominated by $$T_1 \sim (3Nkd) \cdot \Im \cdot T^{flop} \quad (3)$$

By implementing a version of k-means on a distributed memory machine with P processors, the total computation time can be reduced by nearly a factor of P. Because the "distance calculations" shown in lines 14–21 of FIG. 2 can be executed asynchronously and in parallel for each data point, and because the computations performed in these lines dominate the computational complexity of steps (b) and (c) above when the number of data points is large, an effective parallelization strategy can be implemented which reduces the computation complexity. This strategy is to divide the N data points into P blocks (each of size roughly N/P) and compute lines 14–21 for each of these blocks in parallel on a different processor.

The parallelization strategy has another benefit. In some cases, the local (in-core) memory of the processor performing the k-means algorithm is insufficient to store all of the data. However, by dividing the N data points among P processors, large data sets can be handled by the combined memory of the P processors. For example, a data set of 2 gigabytes would be difficult for most single processors to handle, but fits easily when divided among 16 processors 102, each with a main memory of 256 megabytes.

A Parallel k-Means Process

As previously described, the iterations performed during the process of assigning data points to the closest cluster centroid dominate the total computation time. These operations can be executed in parallel if the centroids $\{m_j\}_{j=1}^k$ are available to each data point. The present invention parallelizes the k-means computation by dividing the set of data points N into P blocks (each of size roughly N/P) and assign the data points to the closest cluster centroid for each of the data blocks in parallel using a different processor 102 while ensuring that each processor 102 has its own local copy of the centroids $\{m_j\}_{j=1}^k$.

Figure 3:
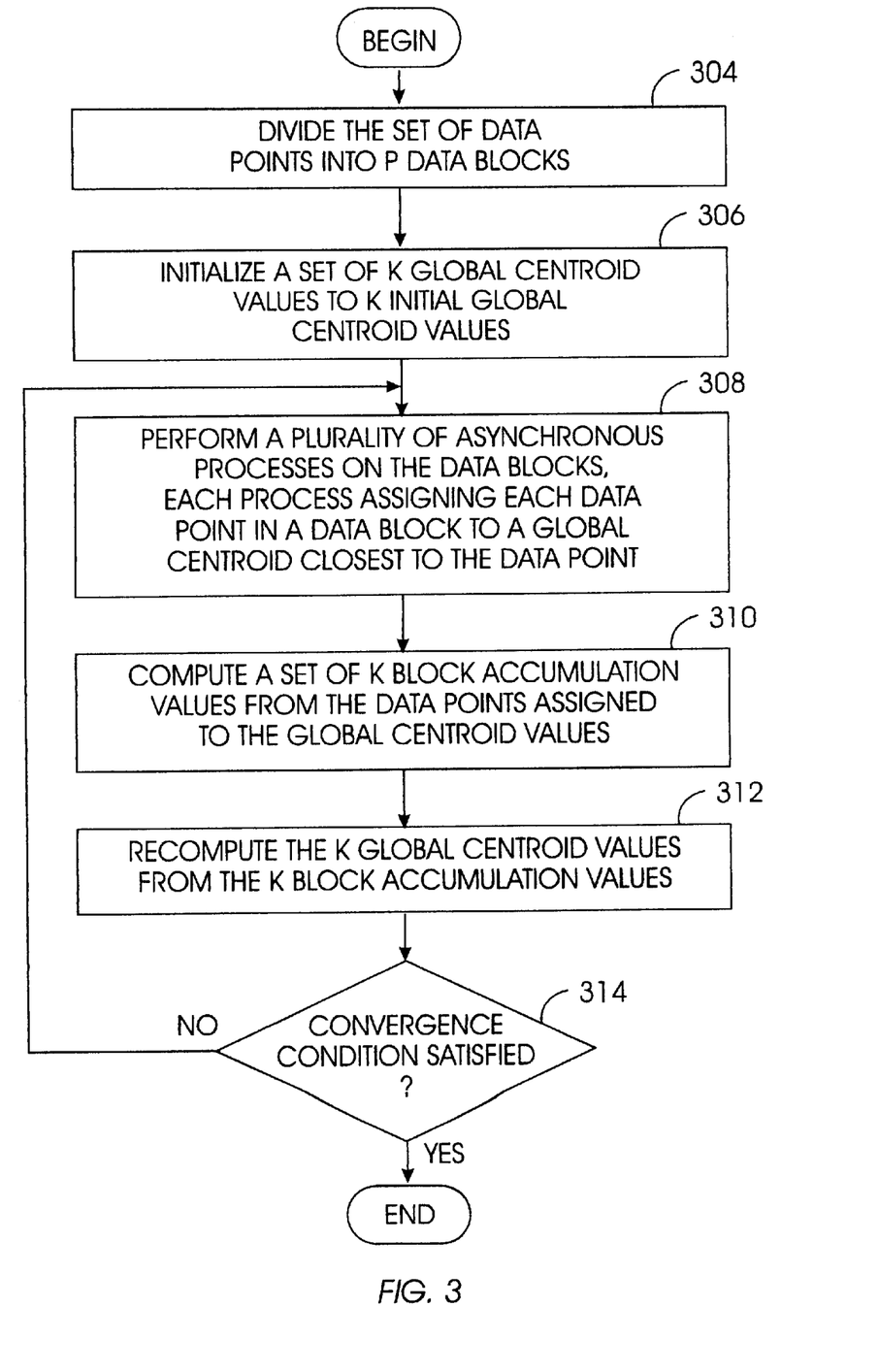
FIG. 3 is a flow chart illustrating the steps performed in implementing a parallel k-means process.
Figure 4:
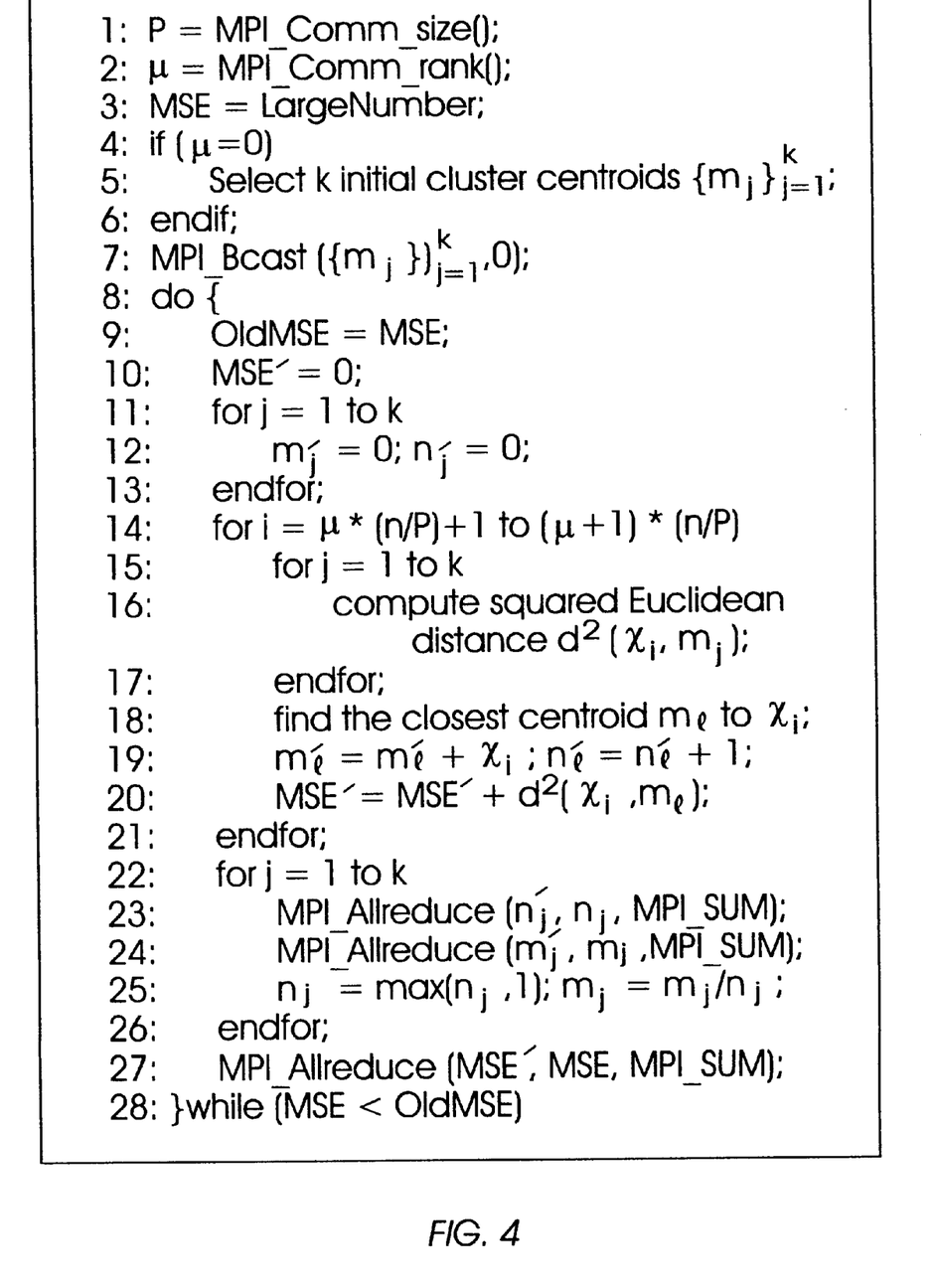
FIG. 4 is a diagram of representative computer program instructions implementing a parallel k-means process.

FIG. 3 is a flow chart illustrating the steps performed in implementing a parallel k-means process. FIG. 4 presents representative computer program instructions implementing the operations shown in FIG. 3.

First, the set of data points N is divided into P data blocks. This is depicted in block 304. This process can be performed by a separate software or hardware module 110 within each processor 102. Ordinarily, the data blocks are selected so that each is substantially the same size N/P, but the present invention can be implemented with data blocks of different sizes. Further, if the processors 102 involved in the computations are not of equal memory or processing throughput capability, the data block size could be advantageously selected so as to assign larger blocks to processors in accordance with each processor's processing throughput and/or memory capacity. Data blocks can also be selected so that those requiring computations of greater complexity are performed by special purpose processors, or processors of greater capacity. One technique for assigning data points to data blocks is to serially assign data points to blocks. In the implementation shown in FIG. 4, for example, each process $\mu=0, 1, 2, \ldots, P-1$, it is assumed to have access to the data subset $$\{X_i, i=(\mu)*(N/P)+1, \ldots, (\mu+1)*(N/P)\}. \qquad (4)$$

Next, k initial global centroid values are defined and broadcast to the processes. This operation, which is depicted in block 306, and in lines 4–7 of FIG. 4, can be performed by a separate software or hardware module 108 within each processor 102. As with any gradient-descent procedure, the number of iterations required to reduce the mean square error between the current computed centroid values and the local minimum error centroid values will depend on these initial global centroid values. Operations are performed for the data in each block relative to these global centroid values, as described below.

After the global centroid values are initially defined (whether by arbitrary or heuristic assignment), each data point in the data blocks is assigned to the closest global centroid value, as shown in block 308 of FIG. 3. After all of the data points in each data block have been assigned to a global centroid value, a set of block accumulation values are computed as the sum of the data points assigned to each of the global centroid values. This process allows the centroid values to "migrate" to values which as a whole, result in a smaller mean squared error in accordance with equation (1) above. This is shown in block 310 of FIG. 3 and in lines 15–19 of FIG. 4. This process is performed in parallel by a plurality of processes, operating asynchronously from one another. Ordinarily, each of the processes is performed on a dedicated processor 102, with each processor operating on the data in its assigned data block.

As with other processes herein described, this operation can be implemented by a separate processor procedure, a larger processor procedure, or by special purpose hardware. Also, each data block will normally have a dedicated processor to perform these calculations, but without loss of generality, this process can be practiced by allowing one or more of the processors 102 to operate on the data in more than one data block. Finally, for illustrative purposes, FIG. 3 shows a case where P divides N, but this need not be the case.

Before the next iteration of the k-means computation can proceed, each process must communicate with the other processes the k global centroids $$\{m_j\}_{j=1}^{k}$$

must be recomputed from the values received from each of the other processes. This operation was previously described as step (c) above, and in block 312 of FIG. 3. This global communication (and hence synchronization) is also depicted in lines 22–26 of FIG. 4. Finally, the operations depicted in blocks 306 through 312 continue until a convergence condition is satisfied, as illustrated by block 314.

Figure 5:
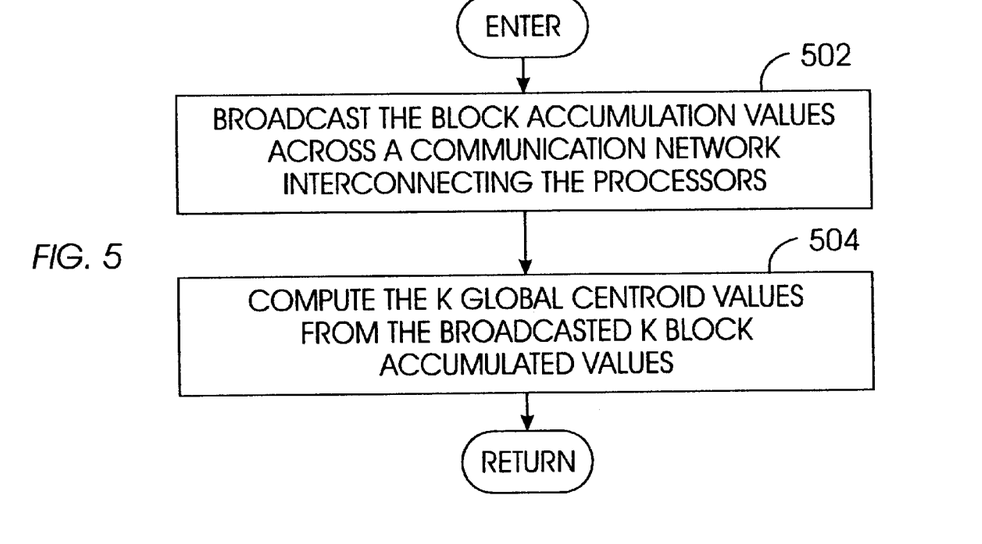
FIG. 5 is a flow chart illustrating the operations performed in recomputing global centroid values from block accumulation values.

FIG. 5 is a block diagram illustrating the operations performed in recomputing the k global centroid values from the k block accumulation values. First, the block accumulation values are broadcast 502 across the communication network 106 to other processors 102 in the multi-processor system 100. Then, the k global centroid values are computed from the broadcasted k block accumulation values, as shown in block 504. In this embodiment, each process computes and transmits a set of block accumulation values from the sum of the data points assigned to each global centroid value. The global centroids $$\{m_j\}_{j=1}^{k}$$

can be computed from those values. Alternatively, each process may compute a set of k block centroid values, which may be communicated and used by other processes to determine the global centroids. Here, the k global centroid values may be computed as the mean of the associated k block centroid values, but the global centroid values can also be computed as a weighted mean, or by other statistical measures.

Figure 6:
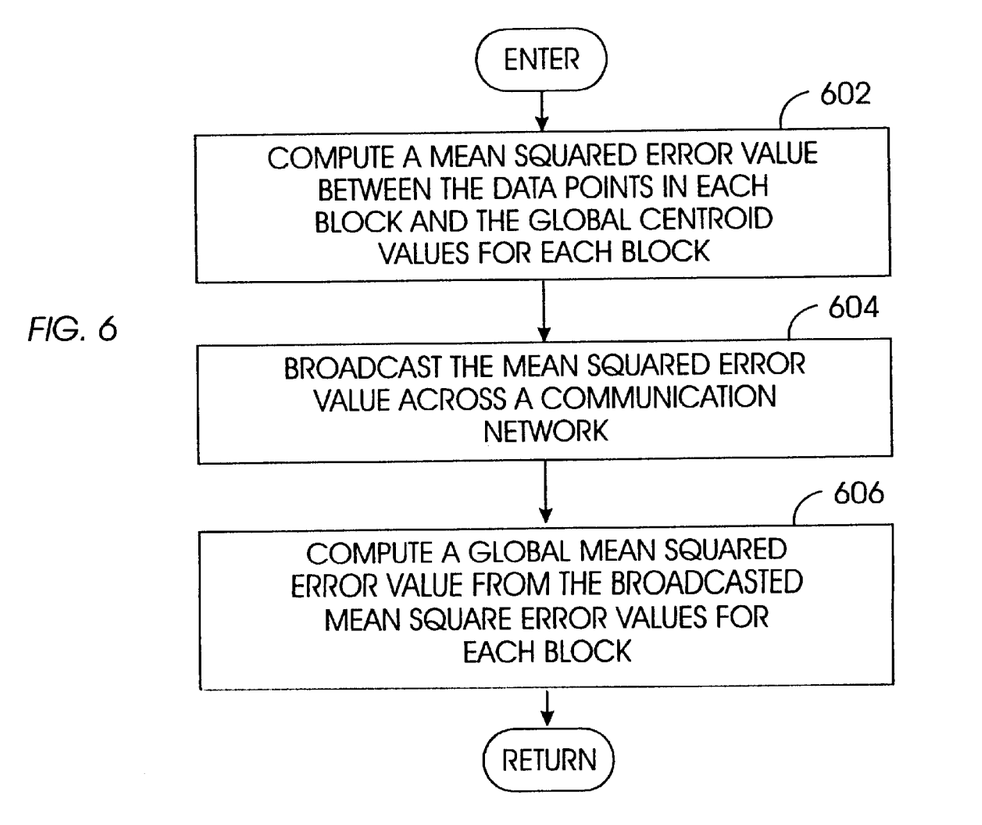
FIG. 6 is a flow chart illustrating the operations performed in determining whether a local convergence condition is satisfied.

FIG. 6 is a flow chart illustrating one embodiment of the processes implemented to determine whether the convergence condition is satisfied. First, as depicted in block 602, of FIG. 6 and line 20 of FIG. 4, a mean squared error value is computed for each data block. The mean squared error represents a measure of the distance between the data points and the global centroid values in each block. Then, the mean squared error value is broadcast to other processors 102 across the communication network 106.

When each processor 102 in the multiprocessor network 100 receives the data block mean squared error values from the other processors 102, a global mean squared error value is computed from the broadcasted mean squared error values. If this global mean squared error value is within acceptable bounds, the global centroid values have been computed and no further iterations are required. If the computed global mean squared error value is not within acceptable bounds, each the centroid values for each block are set to the global centroid values just computed, and the process continues again.

Referring back to FIG. 4, line 27 ensures that each of the P processors has a local copy of the total (global) mean squared error (MSE). Hence, each process can independently decide on the convergence condition, that is, when to exit the "do {. . . } while" loop of lines 8–28. The error measures presented herein are but one possible embodiment of the present invention. Using the foregoing teaching, other error measures may also be used, including L' distance, L$^\infty$ distance, cosine similarity, and log-likelihood distance measures It is important to note that the specific embodiment presented in FIG. 4 is presented for illustrative purposes, and is not optimized for speed. For example, instead of using (2k+1) different "MPI_Allreduce" operations, as suggested by lines 23, 24, and 27 of FIG. 4, a single block "MPI_Allreduce" by assigning a single, contiguous block of memory for the variables $$\{m_j\}_{j=1}^{k}, \{n_j\}_{j=1}^{k},$$

and MSE, and a single, contiguous block of memory for the variables $$\{m'_j\}_{j=1}^{k}, \{n'_j\}_{j=1}^{k},$$

and MSE'.

Predicted Computation Time

As described above, each iteration of the parallel k-means algorithm comprises an asynchronous computation phase followed by a synchronous communication phase.

Asynchronous Computation Phase: In accordance with the foregoing, each of the P processors 102 can execute lines 9–21 of FIG. 4 asynchronously and in parallel. One benefit of parallelization is that the computational burden is shared substantially equally by the P processors. Since each process needs to handle only N/P data points, the total computational time for the parallel k-means becomes $$T_P^{comp} = \frac{T_1}{P} \sim \frac{(3Nkd) \cdot \mathcal{T} \cdot T^{flop}}{P}. \tag{5}$$

Synchronous Communication Phase: Since, in each iteration, the "MPI_Allreduce" operation must be performed on roughly d·k floating point numbers, the communication time for the parallelized k-means computation can be estimated as $$T_P^{comm} \sim d \cdot k \cdot \mathcal{T} \cdot T_P^{reduce}, \tag{6}$$

where $T_P^{reduce}$ denotes the time (in seconds) required to "MPI_Allreduce" a floating point number on P processors. In most architectures, $T_P^{reduce}$ can be approximated by $T_P^{reduce}$=Orderof(logP).

Equations (5) and (6) can now be combined to represent an estimation of the computational complexity of the parallel k-means algorithm as $$T_P = T_P^{comp} + T_P^{comm} \sim \frac{(3Nkd) \cdot \mathcal{T} \cdot T^{flop}}{P} + d \cdot k \cdot \mathcal{T} \cdot T_P^{reduce}. \tag{7}$$

Equation (7) shows that the relative cost for the communication phase $T_P^{comm}$ is insignificant compared to the computational phase $T_P^{comp}$ if $$\frac{P \cdot T_P^{reduce}}{3 \cdot T^{flop}} \ll N. \tag{8}$$

Since the left hand side of the above relation is a machine constant, as the number of data points N increases, the relative cost for the communication phase compared to the computation phase will progressively decrease.

Performance and Scalability

To determine the effectiveness of the parallelized method for computing the k-means described herein, a relative speedup of the parallel process on P processors is defined as the ratio of the execution time for identically clustering the same data set on P processors. Using (3) and (7), $$\text{Speedup} = \frac{T_1}{T_P} = \frac{(3Nkd) \cdot \mathcal{T} \cdot T^{flop}}{\left(\frac{(3Nkd) \cdot \mathcal{T} \cdot T^{flop}}{P}\right) + d \cdot k \cdot \mathcal{T} \cdot T_P^{reduce}}, \tag{9}$$

where $T_1$ denotes the time to complete computation sequentially, and $T_P$ denotes the time to perform the computation in parallel. The relation shown in equation (9) approaches a linear speedup of P when the condition of equation (8) is satisfied (the number of data points N is large).

For a fixed data set (or problem size), speedup describes the decrease in execution time that can be obtained by increasing the number of processors. Another figure of merit for a parallel algorithm is "scaleup" which describes how well the parallel algorithm handles larger data sets when more processors are available. Relative scaleup of the parallel k-means algorithm with respect to N is defined as the ratio of the execution time (per iteration) for clustering a data set with N data points on one processor to the execution time (per iteration, not raw execution time) for clustering a data set with N·P data points on P processors, where the number of dimensions d and the number of desired clusters k are held constant. It is necessary to consider per-iteration execution time instead of raw execution time because the k-means algorithm may require a different number of iterations $\Im$ for a different data set. Using (3) and (7), relative scaleup with respect to N can be expressed as:

$$\text{Scaleup} = \frac{(3Nkd) \cdot T^{flop}}{\frac{(3Nkd) \cdot T^{flop}}{P} p + d \cdot k \cdot T_P^{reduce}}. \tag{10}$$

It follows from equation (10) that if $$\frac{T_P^{reduce}}{3 \cdot T^{flop}} \ll N, \tag{11}$$

then we expect the relative scaleup to approach the constant 1. It is worthy to note that condition (10) is weaker than (7), and is more easily satisfied for a large number of data points.

Experimental Results

FIGS. 7–10 are graphs depicting the results of experiments that were performed to study the speedup characteristics of the foregoing algorithm.

Figure 7:
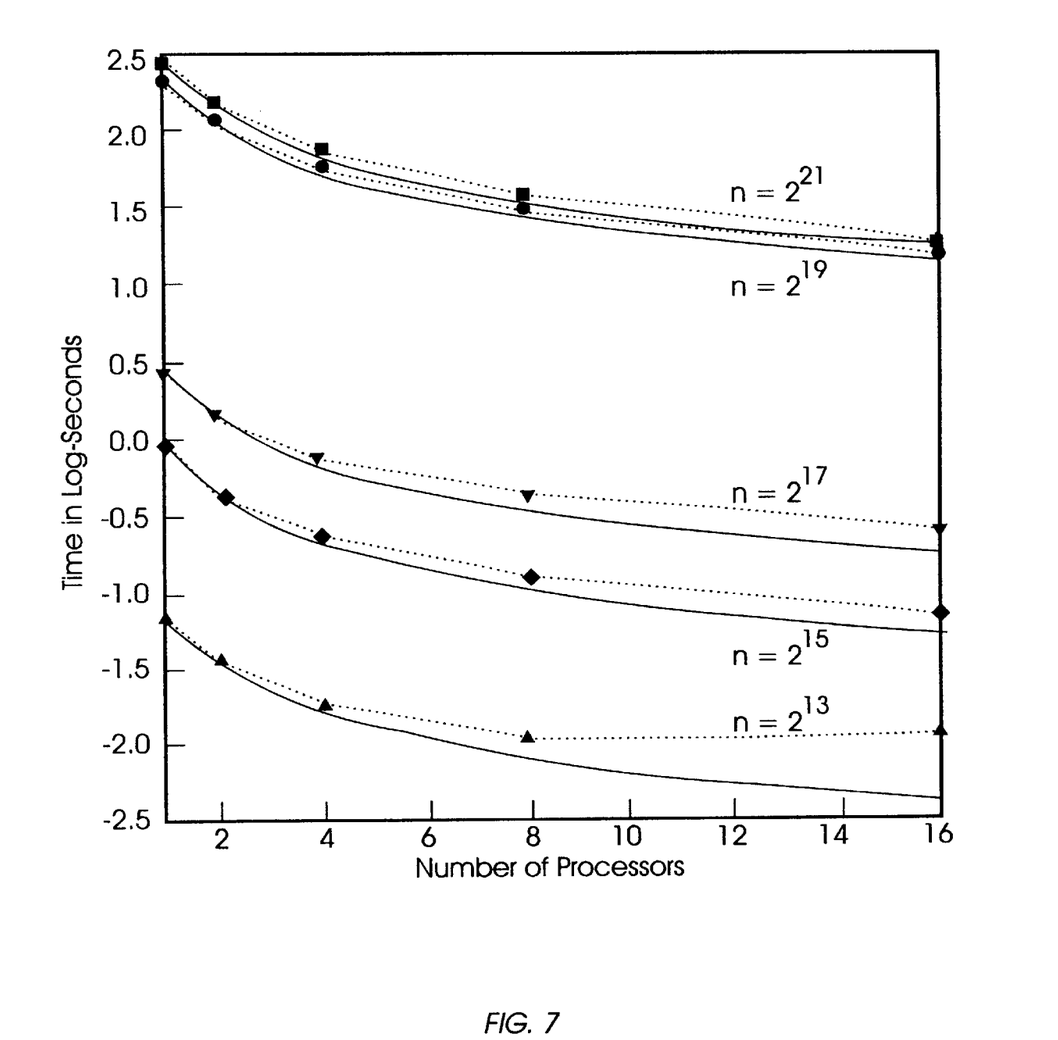
FIG. 7 is a graph showing the effect of the number of processors and the number of data points on the execution time of the k-means parallel algorithm.

FIG. 7 is a graph showing the effect of the number of processors on execution time as the number of data points N is varied. In this example, five data sets, with N=$2^{13}$, $2^{15}$, $2^{17}$, $2^{19}$, and $2^{21}$ were considered, and the number of dimensions d and the number of desired clusters k were both set at 8. Each data set was clustered on P=1, 2, 4, 8, and 16 processors. For each data set, the k-means algorithm required $\Im$=3, 10, 8, 164, and 50 iterations. For each data set, a dotted line depicts observed execution times, and a solid line denotes "ideal" execution times obtained by dividing the observed execution time for one processor by the number of processors.

Figure 8:
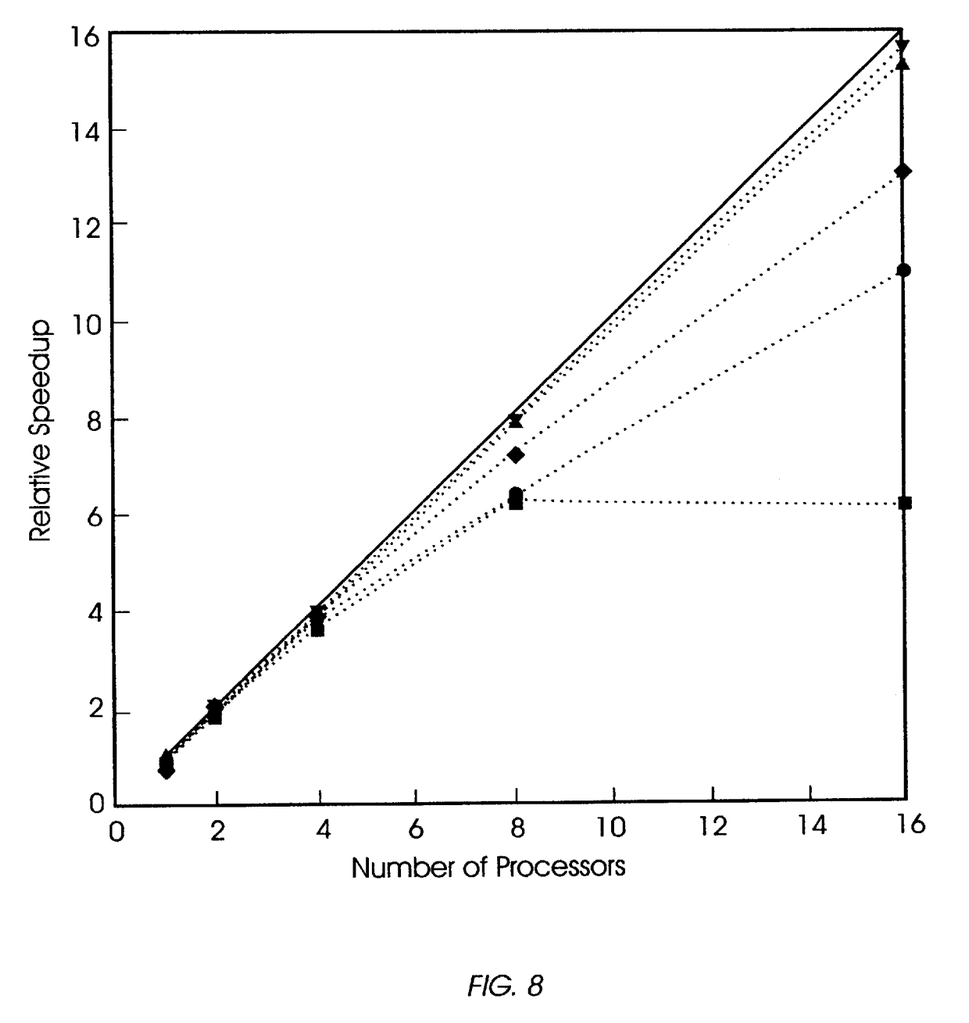
FIG. 8 is a graph showing relative speedup curves.

FIG. 8 is a diagram showing the relative speedup curves corresponding to those presented in FIG. 7. It is noteworthy that for the largest data set (N=$2^{21}$) a relative speedup of 15.62 was observed on 16 processor. Thus, for a large number of data points N, the parallel k-means algorithm as a nearly linear relative speedup. It is also noteworthy that for a fixed number of processors (i.e. P=16), as the number of data points increase from N=$2^{11}$ to N=$2^{21}$ the observed relative speedup generally increases from 6.62 to 15.62, respectively. This indicates that the parallel k-means algorithm has excellent sizeup behavior in the number of data points.

Figure 9:
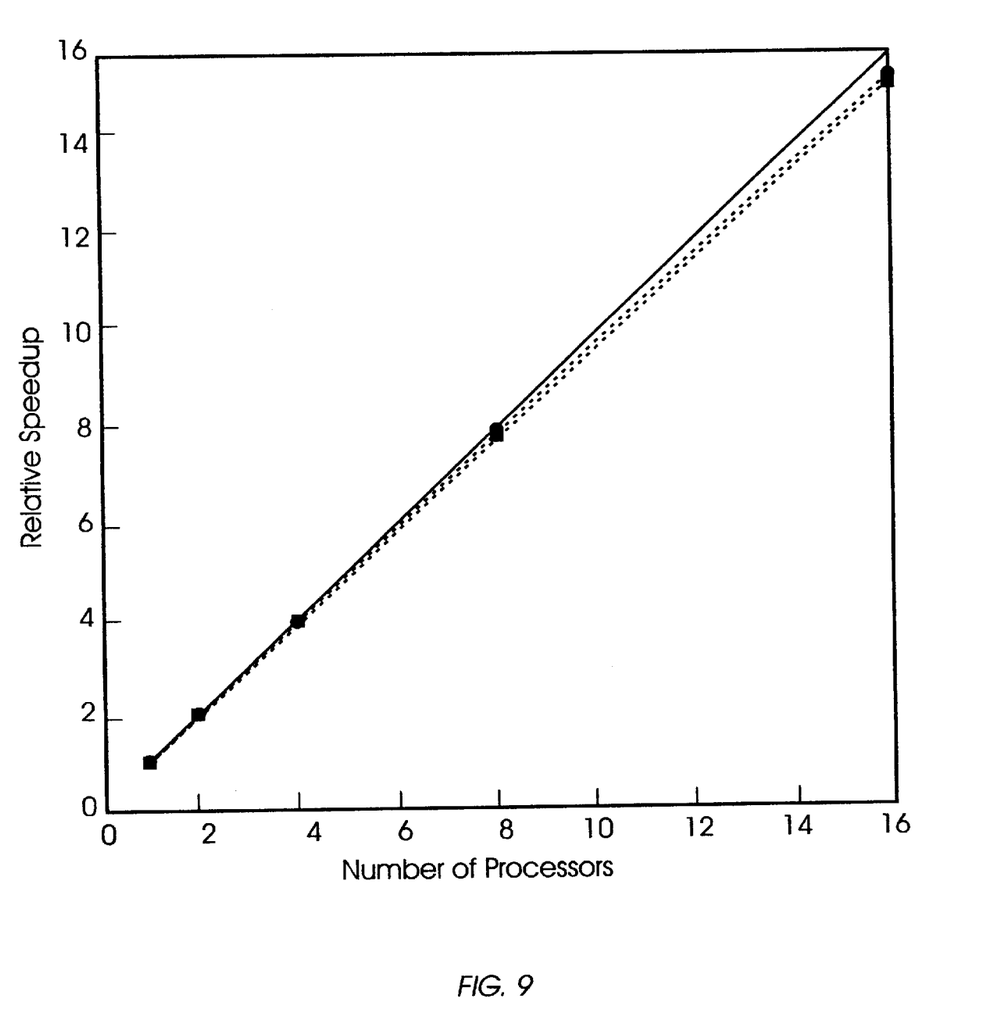
FIG. 9 is a diagram showing the relationship between speedup characteristics of the parallel k-means algorithm and the number of dimensions.

FIG. 9 is a diagram showing the speedup behavior as the number of dimensions d are varied. In this example, the number of data sets were set at 2, 4, and 8, the number of data points was set at $2^{21}$, the number of desired clusters k=8, and each data sets was clustered on P=1, 2, 4, 8, and 16 processors.

Figure 10:
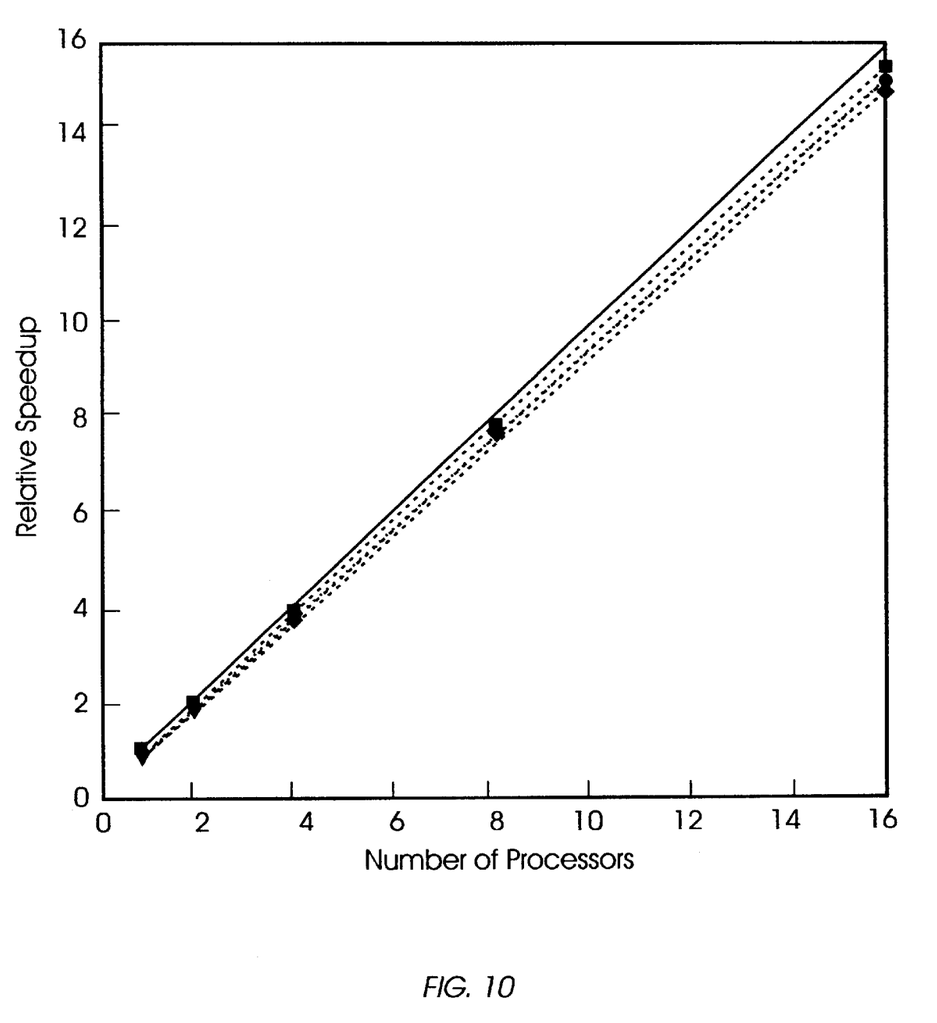
FIG. 10 is a diagram showing the relationship between the speedup characteristics of the parallel k-means algorithm and the number of clusters.

FIG. 10 is a diagram showing the speedup behavior when the number of desired clusters k is varied. In this example, the number of data sets was set at 2, 4, 8, and 16, the number of data points was set at $2^{21}$, and the number of dimensions was set to 8, and each data sets were clustered on P=1, 2, 4, 8, and 16 processors. FIG. 9 shows that there is a nearly linear speedup between 15.42 and 15.52 on 16 processors. Similarly, FIG. 10 shows that there is a nearly linear speedup between 15.08 to 15.65 on 16 processors. These speedup numbers are attributable to the fact that for $N=2^{21}$, condition (8) is satisfied. It is also worthy to note that all of the relative speedup numbers in FIGS. 9 and 10 are essentially independent of d and k.

Figure 11:
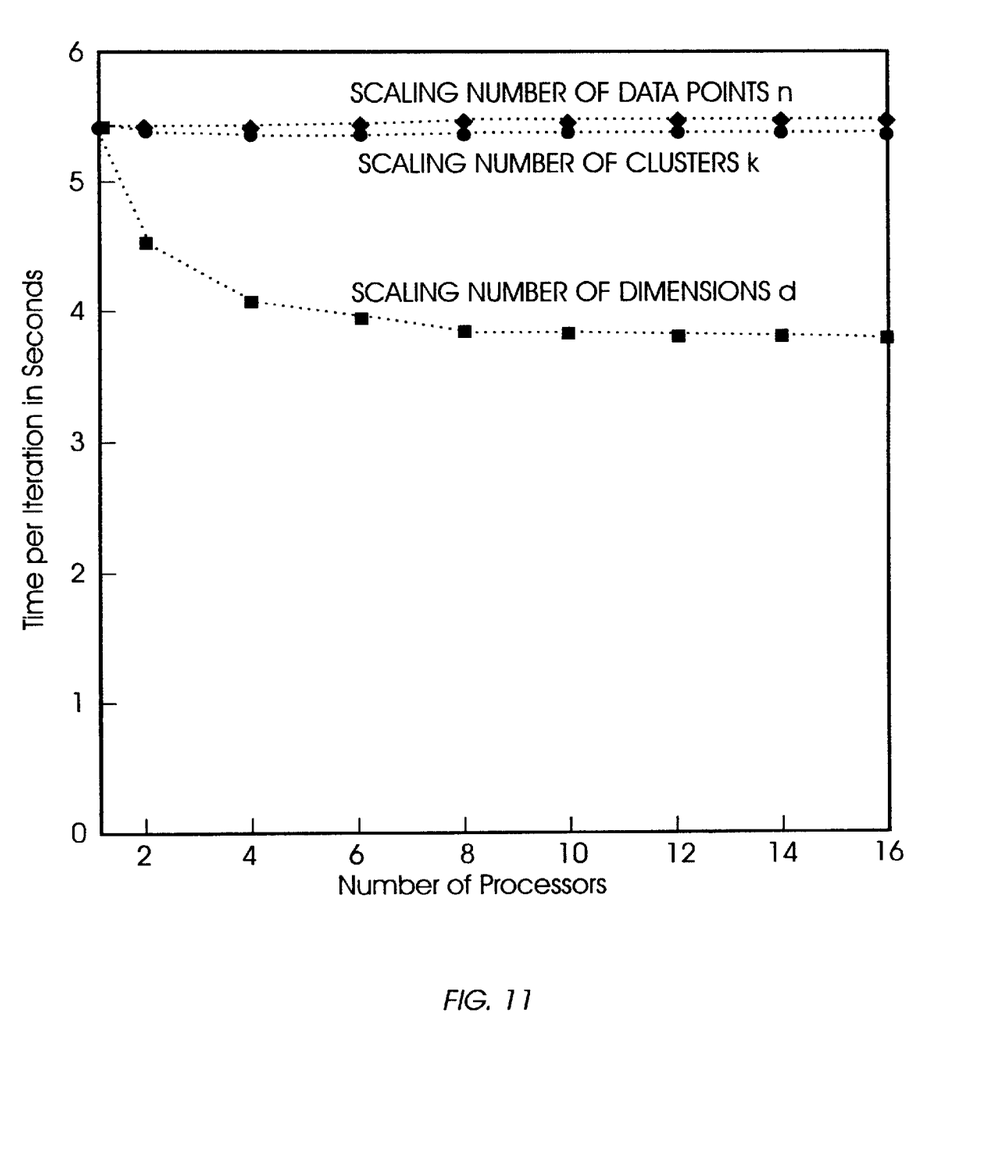
FIG. 11 is a diagram showing the scale-up characteristics of the parallel k-means algorithm.

FIG. 11 is a diagram showing the scaleup characteristics of the parallel k-means algorithm. Execution time per iteration (in seconds) is depicted as a function of the number of processors. For the case with a single processor, the number of data points was set to $N=2^{21}$, d=8 and k=8.

The upper curve in FIG. 11 depicts the scaleup with respect to N. This curve was obtained by clustering data sets with $N=2^{21} \cdot P$ on P=1, 2, 4, 8, and 16 processors, respectively, and by setting d=k=8. These results show that the parallel k-means algorithm delivers nearly constant execution times in number of processors, and hence, has excellent scaleup with respect to the number of data points. In this example, the largest data set with $N=2^{21} \cdot 16$ processors≅2 gigabytes. In a case where the main memory available at each processor is 256 megabytes, all of the data will not fit into the main memory of any single node, but fits easily in the combined main memory of 16 nodes. This ability to cluster significantly larger data sets in-core is another benefit of the k-means parallel algorithm.

The middle curve in FIG. 11 depicts scaleup performance with respect to k. This curve was obtained by clustering a data set into k=8·P clusters on P=1, 2, 4, 8, and 16 processors, respectively, by fixing the number of data points at $N=2^{21}$, and the number of dimensions d=8. The execution times per iteration show that the parallel k-means algorithm provides constant execution times in number of processors, and hence has excellent scaleup with respect to k.

The lower curve in FIG. 11 depicts scaleup performance with respect to d. This curve was obtained by clustering data sets with the number of dimensions d=8·P on P=1, 2, 4, 8, and 16 processors, respectively, by fixing the number of data points to $N=2^{21}$ and the number of desired clusters k to 8. The execution times per iteration show that the parallel k-means algorithm delivers better than constant execution times in d in the number of processors, and hence has good scaleup characteristics with respect to d. This phenomenon is due to the reduced loop overhead in the distance calculations as d increases.

Conclusion

This concludes the description of the preferred embodiments of the present invention. In summary, the present invention describes a method, apparatus, article of manufacture, and a memory structure for detecting relationships in a database in parallel using a distributed-memory multi-processor system, thus allowing rapid and flexible k-means computation for data mining.

The method comprises the steps of dividing a set of data points into a plurality of data blocks, initializing a set of k global centroid values in each of the data blocks k initial global centroid values, performing a plurality of asynchronous processes on the data blocks, each asynchronous process assigning each data point in each data block to the closest global centroid value within each data block, computing a set of k block accumulation values from the data points assigned to the k global centroid values, and recomputing the k global centroid values from the k block accumulation values. The article of manufacture comprises a data storage device tangibly embodying instructions to perform the method steps described above.

The apparatus comprises a plurality of asynchronous processors, each associated with one of the plurality of data blocks and operating on the data points within the associated data blocks, each processor implementing a plurality of modules, including first module for initializing a set of k global centroid values to k initial global centroid values, a second module for assigning each data point in each data block to the closest global centroid value, a third module for computing a set of k block accumulation values from the data points assigned to the k global centroid values, and a fourth procedure for recomputing the global centroid values from the k block accumulation values from the plurality of data blocks.

The present invention also describes a memory for storing data for clustering a set of data points about k global centroid values. The memory is comprised of a plurality of local memories, each directly accessible by one of a plurality of processors intercoupled by a communication network. Each of the local memories comprises a data structure including a data block comprising a unique subset of the set of data points, block accumulation values and global centroid values.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

For example it is known that the k-means algorithm is a hard-thresholded version of the expectation-maximization (EM) algorithm. The EM algorithm (described more fully in G. J. McLachlan and T. Krishnan, *The EM Algorithm and Extensions*, Wiley, (1996) which is herein incorporated by reference) can also be effectively parallelized using essentially the same strategy described herein.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of clustering a set of data points into k clusters, comprising:

(a) dividing the set of data points into P data blocks of substantially equal size, each data block assigned to one of P processors;

(b) selecting k initial global centroids with a first processor and broadcasting the k initial global centroids from the first processor to the remaining P−1 processors;

(c) computing the distance from each data point in each data block to the global centroid values by using the processor associated with the data block;

(d) assigning each data point in each data block to a global centroid value closest to the data point by using the processor associated with the data block;

(e) computing k block accumulation values in each block from the data points assigned thereto; and (f) recomputing the k global centroid values from the k block accumulation values computed for each data block.

2. The method of claim 1, wherein the number of data points in each block is substantially proportional to the processing speed of the processor assigned to the data block.

3. The method of claim 1, wherein (c)–(e) are performed by the P processors asynchronously.

4. The method of claim 1, wherein the recomputing the k global centroid values in each block from the k block accumulation values from each data block comprises:
broadcasting the k block accumulation values to the P processors; and
computing the k global centroid values for each block from the broadcasted k block accumulation values.

5. The method of claim 1, further comprising repeating (c) through (f) until a convergence condition is satisfied.

6. A method of clustering a set of data points into k clusters, comprising:
(a) dividing the set of data points into a plurality of data blocks;
(b) initializing a set of k global centroid values in each of the plurality of data blocks to k initial global centroid values;
(c) performing a plurality of asynchronous processes on the data blocks, each asynchronous process assigning each data point in a data block to a global centroid value closest to the data point;
(d) computing a set of k block accumulation values in each block from the data points assigned to the k global centroid values; and
(e) recomputing the k global centroid values from the k block accumulation values from the plurality of data blocks.

7. The method of claim 6, wherein the initial k global centroid values are chosen arbitrarily.

8. The method of claim 6 wherein (d) is performed by the plurality of asynchronous processes.

9. The method of claim 6, further comprising repeating (c) through (e) until a convergence condition is satisfied.

10. The method of claim 9, wherein the convergence condition includes a mean squared error between the global centroid values and the data points, and the repeating of steps (b) through (e) until a convergence condition is satisfied comprises:
computing a mean squared error value between the data points in each data block and the global centroid values;
broadcasting the mean squared error value for each data block across a communication network; and
computing a global mean squared error value from the broadcasted mean square error values for each data block.

11. The method of claim 6, wherein the block accumulation values are computed as a sum of the data points assigned to the global centroid values.

12. The method of claim 11, wherein the global centroid values are recomputed from the block accumulation values.

13. The method of claim 6, wherein the asynchronous processes are performed on a plurality of processors.

14. The method of claim 6, wherein the set of data points is divided into P data blocks, each data block associated with one of P processors, and the assigning each data point in each block to the closest global centroid value and computing the block accumulation values from the data points assigned to the global centroid values are performed for each data block by the processor associated with the data block.

15. The method of claim 14, wherein the recomputing the k global centroid values from the k block accumulation values comprises:
broadcasting the block accumulation values across a communication network interconnecting the processors; and
computing the k global centroid values from the broadcasted k block accumulation values.

16. The method of claim 6, wherein the recomputing the global centroid values from the block accumulation values is performed by the plurality of asynchronous processes.

17. The method of claim 6, wherein the data blocks each comprise substantially the same number of data points.

18. An apparatus for clustering a set of data points into k clusters, comprising:
(a) means for dividing the set of data points into a plurality of data blocks;
(b) means for initializing a set of k global centroid values in each of the plurality of data blocks to k initial global centroid values;
(c) a plurality of processors for performing a plurality of asynchronous processes on the data blocks, each asynchronous process assigning each data point in a data block to a global centroid value closest to the data point, and computing a set of k block accumulation values from the data points assigned to the global centroid values; and
(e) means for recomputing the k global centroid values from the k block accumulation values from the plurality of data blocks.

19. The apparatus of claim 18, further comprising means for arbitrarily defining the k global centroid values.

20. The apparatus of claim 18, further comprising means for determining when a convergence condition is satisfied.

21. The apparatus of claim 18, wherein the convergence condition includes a mean squared error between the global centroid values and the data points, and the means for determining when a convergence condition is satisfied comprises:
means for computing a mean squared error value between the data points in each block and the global centroid values for each data block;
means for broadcasting the mean squared error value across a communication network; and
means for computing a global mean squared error value from the broadcasted mean square error values for each block.

22. The apparatus of claim 18, wherein the means for computing the block accumulation values comprises means for summing the data points assigned to the global centroid values.

23. The method of claim 22, wherein the means for computing the global centroid values comprises means for averaging the block accumulation values.

24. The apparatus of claim 18, wherein the means for performing a plurality of asynchronous processes on the data blocks comprises a plurality of asynchronously operating processors.

25. The apparatus of claim 18, wherein means for dividing the set of data points into a plurality of data blocks comprises a means for dividing the set of data points into P data blocks, each data block associated with one of P processors, and the means for assigning each data point in each block to the closest global centroid value and recomputing the block accumulation values from the data points assigned to the global centroid values comprises the processor associated with the data block.

26. The apparatus of claim 25, wherein the means for recomputing the k global centroid values from the k block accumulation values comprises:

means for broadcasting the block accumulation values across a communication network; and means for computing the k global centroid values from the broadcasted k block accumulation values.

27. The apparatus of claim 18, wherein the means for recomputing the global centroid values from the block accumulation values comprises a plurality of synchronously operating processors.

28. The apparatus of claim 18, wherein the data blocks each comprise substantially the same number of data points.

29. An apparatus for detecting relationships in a set of data points divided into a set of data blocks, comprising a plurality of asynchronous processors, each associated with one of the plurality of data blocks and operating on the data points within the associated data blocks, each processor implementing a plurality of procedures comprising:

a first procedure for initializing a set of k global centroid values to k initial global centroid values;

a second procedure for assigning each data point in each data block to the closest global centroid value;

a third procedure for computing a set of k block accumulation values from the data points assigned to the k global centroid values; and a fourth procedure for recomputing the global centroid values from the k block accumulation values from the plurality of data blocks.

30. The apparatus of claim 29, wherein each of the plurality of processors further implements a procedure for computing a mean squared error between the global centroid values and the data points.

31. The program storage medium of claim 30, wherein the data blocks each comprise substantially the same number of data points.

32. A program storage medium, readable by a computer, embodying one or more instructions executable by the computer to perform a method for clustering a set of data points around into k clusters, the method comprising:

(a) dividing the set of data points into a plurality of data blocks;

(b) initializing a set of k global centroid values in each of the plurality of data blocks to k initial global centroid values;

(c) performing a plurality of asynchronous processes on the data blocks, each asynchronous process assigning each data point in a data block to a global centroid value closest to the data point;

(d) computing a set of k block accumulation values in each block from the data points assigned to the global centroid values; and (e) recomputing the k global centroid values from the k block accumulation values from the k data blocks.

33. The program storage medium of claim 32, wherein the method further comprises arbitrarily defining the k initial global centroid values.

34. The program storage medium of claim 33, wherein the method further comprises repeating (b) through (e) until a local convergence condition is satisfied.

35. The program storage medium of claim 34, wherein the convergence condition includes a mean squared error between the global centroid values and the data points, and the repeating of (b) through (e) until a convergence condition is satisfied comprises:

computing a mean squared error value between the data points in each block and the global centroid values for each data block;

broadcasting the mean squared error value across a communication network; and computing a global mean squared error value from the broadcasted mean square error values for each block.

36. The program storage medium of claim 32, wherein the block accumulation values are computed as a sum of the data points assigned to the global centroid values.

37. The program storage medium of claim 36, wherein the global centroid values are recomputed from the average of the block accumulation values.

38. The program storage medium of claim 32, wherein the asynchronous processes are performed on a plurality of processors.

39. The program storage medium of claim 38, wherein the set of data points is divided into P data blocks, each data block associated with one of P processors, and the assigning each data point in each block to the closest global centroid value and recomputing the global centroid values from the data points assigned to the global centroid values are performed for each data block by the processor associated with the data block.

40. The program storage medium of claim 39, wherein the recomputing the k global centroid values from the k block accumulation values comprises:

broadcasting the block accumulation values across a communication network; and computing the k global centroid values from the broadcasted k block accumulation values.

41. The program storage medium of claim 32, wherein the recomputing the global centroid values from the block accumulation values is performed synchronously by a plurality of processors.

42. A memory for storing data for clustering a set of data points around k global centroid values, comprising:

a plurality of local memories, each directly accessible by one of a plurality of processors intercoupled by a communication network; and a data structure stored in each local memory, the data structure including a data block comprising a unique subset of the set of data points, block accumulation values and global centroid values.

* * * * *